United States Patent
Ohsawa

(10) Patent No.: US 6,937,550 B2
(45) Date of Patent: Aug. 30, 2005

(54) INFORMATION RECORDING MEDIUM, INFORMATION REPRODUCTION APPARATUS, AND INFORMATION REPRODUCTION METHOD

(75) Inventor: Hideaki Ohsawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 539 days.

(21) Appl. No.: 10/132,208

(22) Filed: Apr. 26, 2002

(65) Prior Publication Data

US 2002/0159376 A1 Oct. 31, 2002

(30) Foreign Application Priority Data

Apr. 27, 2001 (JP) ........................................ 2001-132943

(51) Int. Cl.⁷ ................................................. G11B 7/00
(52) U.S. Cl. ................................ 369/53.14; 369/275.3; 369/53.15; 369/53.17
(58) Field of Search .............................. 369/275.3, 47.1, 369/53.2, 53.17, 53.15, 53.12, 53.13, 53.19

(56) References Cited

U.S. PATENT DOCUMENTS 6,424,614 B1 * 7/2002 Kawamura et al. ...... 369/275.3

FOREIGN PATENT DOCUMENTS

| JP | 62-285232 | 12/1987 | |
|---|---|---|---|
| JP | 11-144393 | * 5/1999 | .............. 369/275.3 |
| JP | 2000-36130 | 2/2000 | |

OTHER PUBLICATIONS

U.S. Appl. No. 10/132,208, filed Apr. 26, 2002, Ohsawa.
U.S. Appl. No. 10/668,209, filed Sep. 24, 2003, Hasegawa.

* cited by examiner

*Primary Examiner*—Nabil Hindi
(74) *Attorney, Agent, or Firm*—Oblon, Spivak, McClelland, Maier & Neustadt, P.C.

(57) ABSTRACT

An information recording medium according to an embodiment of this invention has a plurality of disk-like information recording layers, which are adhered to each other within an allowable decentering error range, and an embossed lead-in area assured on each information recording layer has first guard tracks which are formed within the range of the first radial distance from the radial position of the innermost periphery of the embossed lead-in area toward the outer periphery side, and second guard tracks which are formed within the range of the second radial distance from the radial position of the outermost periphery of the embossed lead-in area toward the inner periphery side.

2 Claims, 7 Drawing Sheets

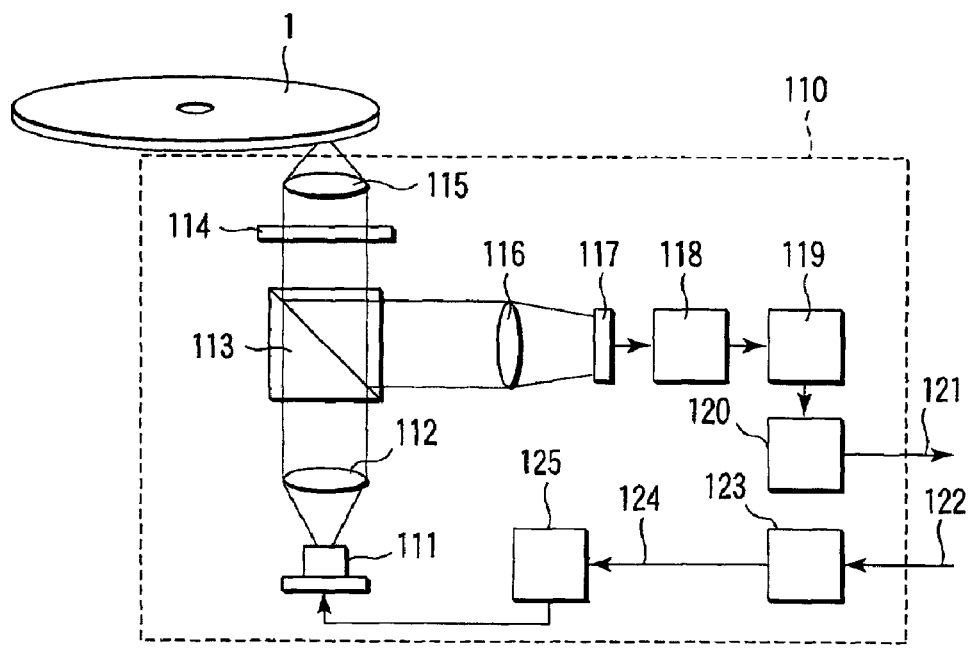
F I G. 12
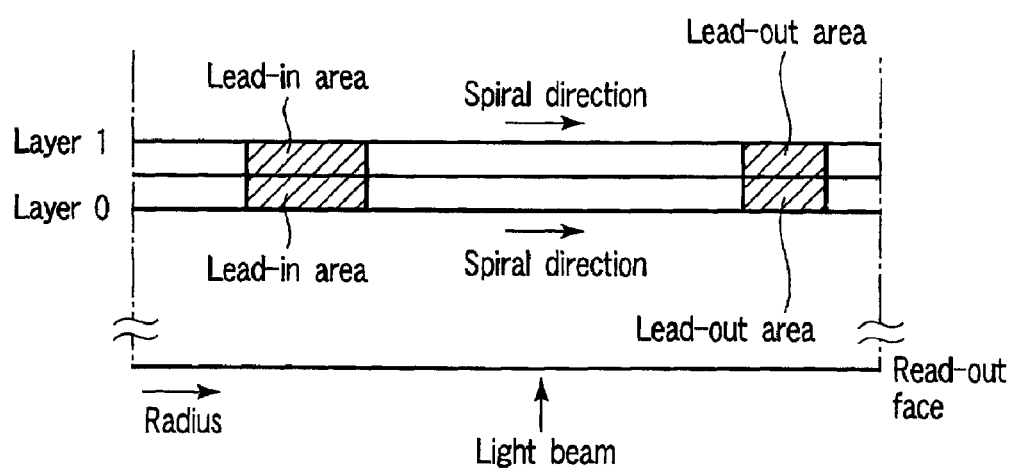
F I G. 13

INFORMATION RECORDING MEDIUM, INFORMATION REPRODUCTION APPARATUS, AND INFORMATION REPRODUCTION METHOD

CROSS-REFERENCE TO RELATED APPLICATIONS

This application is based upon and claims the benefit of priority from the prior Japanese Patent Application No. 2001-132943, filed Apr. 27, 2001, the entire contents of which are incorporated herein by reference.

BACKGROUND OF THE INVENTION

1. Field of the Invention

The present invention relates to an optical information recording medium having a plurality of information recording layers. The present invention also relates to an information reproduction apparatus and information reproduction method for reproducing information from such information recording medium.

2. Description of the Related Art

In recent years, a DVD having a capacity about 7 times that of a CD (compact disk) has been developed, and has become prevalent. DVD disks include read-only DVD-ROM disk, write-once DVD-R disk, rewritable DVD-RAM disk, and the like depending on their characteristics. The DVD disk has a lead-in zone that records sub information in addition to a data zone used to record main information.

JIS X 6243, which specifies the DVD-RAM disk, specifies a data zone and a lead-in zone which is located on the inner periphery side of the data zone. The data zone is a data-rewritable main information recording area. On the other hand, the lead-in zone is an area wherein sub information is recorded by embossed prepit trains. The sub information includes information of a disk structure, recording/reproduction parameters, and the like.

JIS X 6241, which specifies the DVD-ROM disk, specifies a disk having two layers per side. The disk having two layers per side has a larger capacity per side than a disk having one layer per side. In recent years, not only the ROM disk, but also a two-layered rewritable disk has been studied.

In order to realize a two-layered rewritable disk, the influence from the other layer (a layer on the back or front side viewed from the objective lens side) must be reduced. For example, Jpn. Pat. Appln. KOKAI Publication No. 2000-36130 has proposed a method of reducing such influence. Jpn. Pat. Appln. KOKAI Publication No. 2000-36130 describes that the relationship between the reflectance and light absorbency of first and second layers is limited, and the recording order with respect to the first and second layers is limited. In the recording order, information is recorded first on the first layer which is located on the front side viewed from the objective lens side, and is then on the second layer which is located on the back side viewed from the objective lens side. With such limitations, the influence from the other layer can be reduced, and recording/reproduction can be implemented.

However, upon realizing a two-layered rewritable disk, the influence from the other layer due to a decentering error poses another problem. The lead-in zone and data zone have different light reflectances and absorbencies. If the disk is free from any decentering errors, the lead-in zone and data zone in the first layer are formed at the same radial positions as those in the second layer. Therefore, a preventive measure can be taken while predicting influences from the other layer to some extent.

However, it is nearly impossible to manufacture a disk free from any decentering errors. For this reason, the radial positions of the lead-in zone and data zone in the first layer become slightly different from those in the second layer. Such slight difference seriously influences information reproduced near the boundary of the lead-in zone and data zone, resulting in unstable reproduction.

Jpn. Pat. Appln. KOKAI Publication No. 62-285232 discloses an optical disk in which guard areas which do not undergo any data recording/reproduction are formed before and after the boundary between a data read-only area and data recording area. However, this disk does not consider any preventive measure against decentering errors, and the above technique cannot solve the aforementioned problems.

BRIEF SUMMARY OF THE INVENTION

It is an object of the present invention to provide an information recording medium, information reproduction apparatus, and information reproduction method, which can solve the aforementioned problems.

(1) An information recording medium according to an embodiment of the present invention comprises a plurality of disk-like information recording layers which are adhered to each other within an allowable decentering error range, each of the information recording layers comprises an embossed lead-in area which is located at a predetermined radial position, and a data area which neighbors the embossed lead-in area and is located on an outer periphery side of the embossed lead-in area, and on which user data is recorded by phase change recording marks, and the embossed lead-in area comprises first guard tracks which are formed within a range of a first radial distance from a radial position of an innermost periphery of the embossed lead-in area toward the outer periphery side, second guard tracks which are formed within a range of a second radial distance from a radial position of an outermost periphery of the embossed lead-in area toward the inner periphery side, and data recording tracks which are formed between the first and second guard tracks and on which lead-in data is recorded by embossed pits.

(2) An information reproduction apparatus according to an embodiment of the present invention comprises an irradiation section configured to irradiate the information recording medium with a light beam, and a reproduction section configured to receive the light beam reflected by data recording tracks formed between first and second guard tracks on an embossed lead-in area on the information recording medium, and reproduce lead-in data represented in the reflected light beam, the information recording medium comprises a plurality of disk-like information recording layers which are adhered to each other within an allowable decentering error range, each of the information recording layers comprises the embossed lead-in area which is located at a predetermined radial position, and a data area which neighbors the embossed lead-in area and is located on an outer periphery side of the embossed lead-in area, and on which user data is recorded by phase change recording marks, and the embossed lead-in area comprises the first guard tracks which are formed within a range of a first radial distance from a radial position of an innermost periphery of the embossed lead-in area toward the outer periphery side, the second guard tracks which are formed within a range of a second radial distance from a radial position of an outermost periphery of the embossed lead-in area toward the inner periphery side, and the data recording tracks which are formed between the first and second guard tracks and on which lead-in data is recorded by embossed pits.

(3) An information reproduction method according to an embodiment of the present invention comprises: irradiating the information recording medium with a light beam; and receiving the light beam reflected by data recording tracks formed between first and second guard tracks on an embossed lead-in area on the information recording medium, and reproducing lead-in data represented in the reflected light beam, the information recording medium comprises a plurality of disk-like information recording layers which are adhered to each other within an allowable decentering error range, each of the information recording layers comprises the embossed lead-in area which is located at a predetermined radial position, and a data area which neighbors the embossed lead-in area and is located on an outer periphery side of the embossed lead-in area, and on which user data is recorded by phase change recording marks, and the embossed lead-in area comprises the first guard tracks which are formed within a range of a first radial distance from a radial position of an innermost periphery of the embossed lead-in area toward the outer periphery side, the second guard tracks which are formed within a range of a second radial distance from a radial position of an outermost periphery of the embossed lead-in area toward the inner periphery side, and the data recording tracks which are formed between the first and second guard tracks and on which lead-in data is recorded by embossed pits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a block diagram showing an example of an information recording/reproduction apparatus; and FIG. 13 is a view for explaining assignment of physical address data.

DETAILED DESCRIPTION OF THE INVENTION

Figure 1:
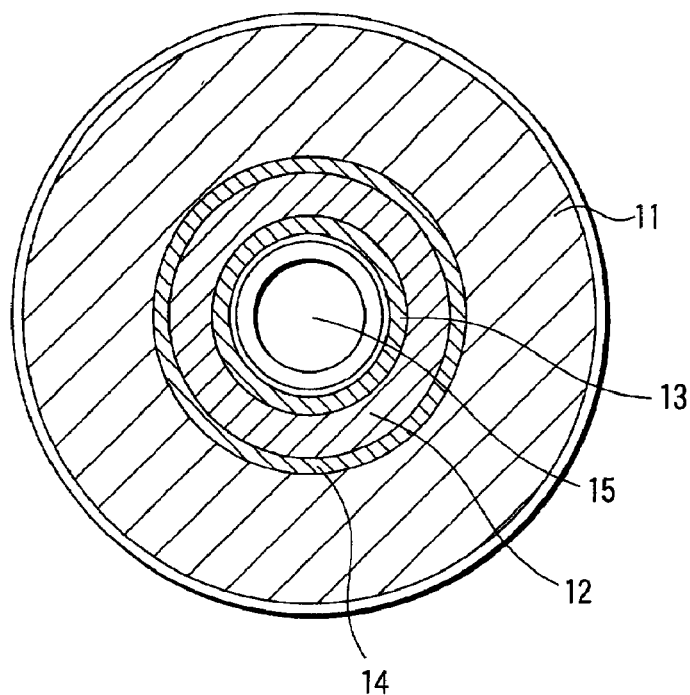
FIG. 1 shows an example of the format of an information recording medium.

A preferred embodiment of the present invention will be described hereinafter with reference to the accompanying drawings.

FIG. 12 shows an information recording/reproduction apparatus according to an embodiment of the present invention. This information recording/reproduction apparatus records information on an information recording medium (optical disk 1) according to an embodiment of the present invention, and reproduces information recorded on that information recording medium.

As shown in FIG. 12, a light beam emitted by a laser beam source 111 is collimated by a collimator lens 112, and enters and is transmitted through a polarization beam splitter (to be referred to as PBS hereinafter) 113. The beam transmitted through the PBS 113 is transmitted through a quarter-wave plate 114, and is focused on the information recording surface of an optical disk 1 by an objective lens 115.

The focused beam is controlled by a focusing servo/tracking servo system to maintain a state wherein the best small beam spot is obtained on the recording surface. When there are a plurality of information recording surfaces like in the information recording medium according to an embodiment of the present invention, a surface which is to undergo recording/reproduction is selected by the focusing servo system, and the focused beam is maintained in a state wherein the best small beam spot is obtained on the selected surface.

The beam which hits the optical disk 1 is reflected by a reflection film in the information recording surface or a reflective recording film. The reflected light is transmitted through the objective lens 115 in the opposite direction, and is converted into collimated light again. The reflected light is transmitted through the quarter-wave plate 114. The reflected light has a plane of polarization perpendicular to that of the incoming light, and is reflected by the PBS 113. The beam reflected by the PBS 113 is converted into a convergent beam by a focusing lens 116, and then enters a photodetector 117. The light beam which has entered the photodetector 117 is photoelectrically converted into an electrical signal, which is sent to a preamplifier 118. The signal amplified by the preamplifier 118 is equalized and binarized by a signal processing circuit 119, and the processed signal is sent to a demodulation circuit 120. The signal is demodulated by the demodulation circuit 120, and is then output as reproduction data 121.

On the other hand, recording data (data symbol) 122 is modulated into a predetermined channel bit sequence by a modulation circuit 123. A bit sequence 124 corresponding to the recording data 122 is converted into a laser drive waveform by a recording control circuit 125. The recording control circuit 125 pulse-drives a laser 111, and records data corresponding to the desired bit sequence 124 on the optical disk 1.

Figure 5:
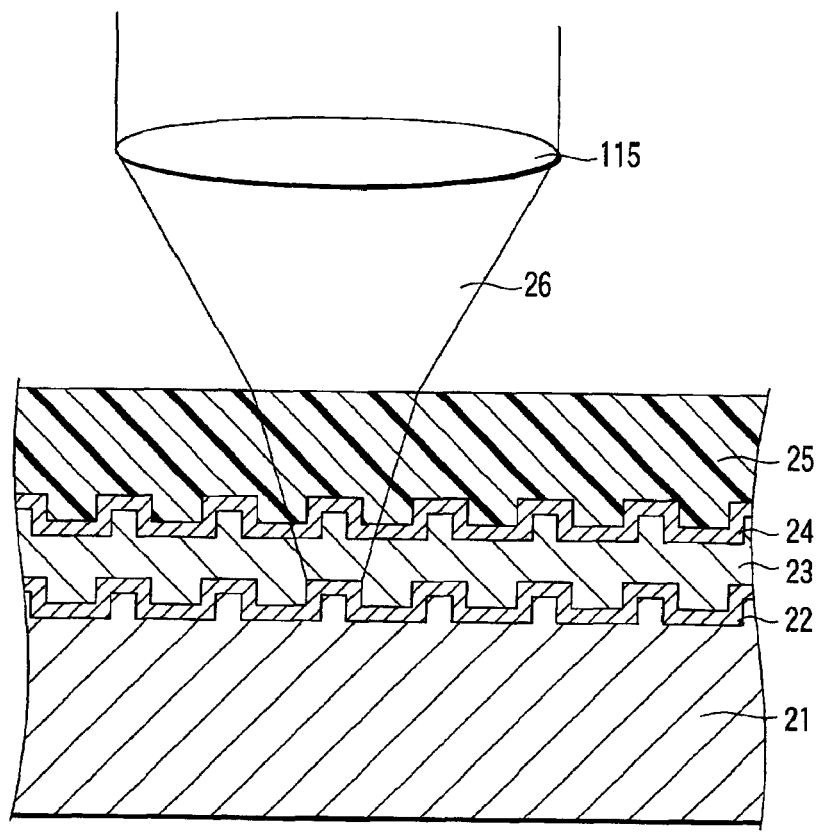
FIG. 5 is a sectional view of the information recording medium, and especially showing an example of an area where embossed prepits are formed.

FIG. 5 is a sectional view showing an example of the information recording medium. The information recording medium has a plurality of information recording layers. As shown in FIG. 5, a second information recording layer 22, intermediate layer 23, and first information recording layer 24 are formed in turn on a substrate 21. Furthermore, a protection layer 25 is formed on the first information recording layer 24. A light beam 37 coming from the objective lens 115 strikes from the side of the protection layer 25, and is controlled to be in focus to the first or second information recording layer 24 or 22.

Upon recording/reproduction on/from the first information recording layer 24, not only light reflected by the first information recording layer 24 but also light reflected by the second information recording layer 22 enter the photodetector 117. Upon recording/reproduction on/from the second information recording layer 22, not only light reflected by the second information recording layer 22 but also light reflected by the first information recording layer 24 enter the photodetector 117.

Such multi-layered rewritable disk has a plurality of information recording layers, each of which has an embossed lead-in area including an embossed prepit train. The influence of the embossed prepit train included in the embossed lead-in area of a given layer on the other layer will be examined below.

Figure 6:
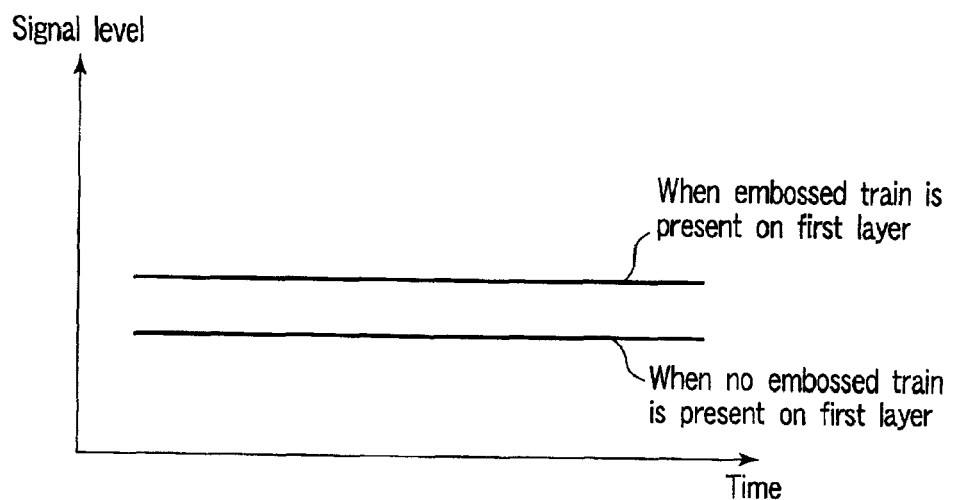
FIG. 6 is a graph showing the signal level difference between a reproduction signal obtained from an area where embossed lead-in areas of the respective information recording layers overlap each other, and a reproduction signal obtained from an area where they do not overlap each other.

FIG. 6 shows a reproduction signal obtained from the second information recording layer 22 (to be simply referred to as a second layer hereinafter) of the disk which has the first information recording layer 24 (to be simply referred to as a first layer hereinafter) and the second layer. FIG. 6 shows reproduction signals in two cases. In the first case, only tracks are formed at identical positions of the first and second layers (at overlapping positions viewed from the objective lens side), and neither an embossed portion nor phase change marks are formed. In the second case, at identical positions of the first and second layers, a track including an embossed prepit train is formed on the first layer, only a track is formed on the second layer, and neither an embossed portion nor phase change marks are formed. As can be seen from FIG. 6, even when the second layer under the same condition is reproduced, a reproduction signal suffers a level difference due to the influence of the first layer.

Figure 7:
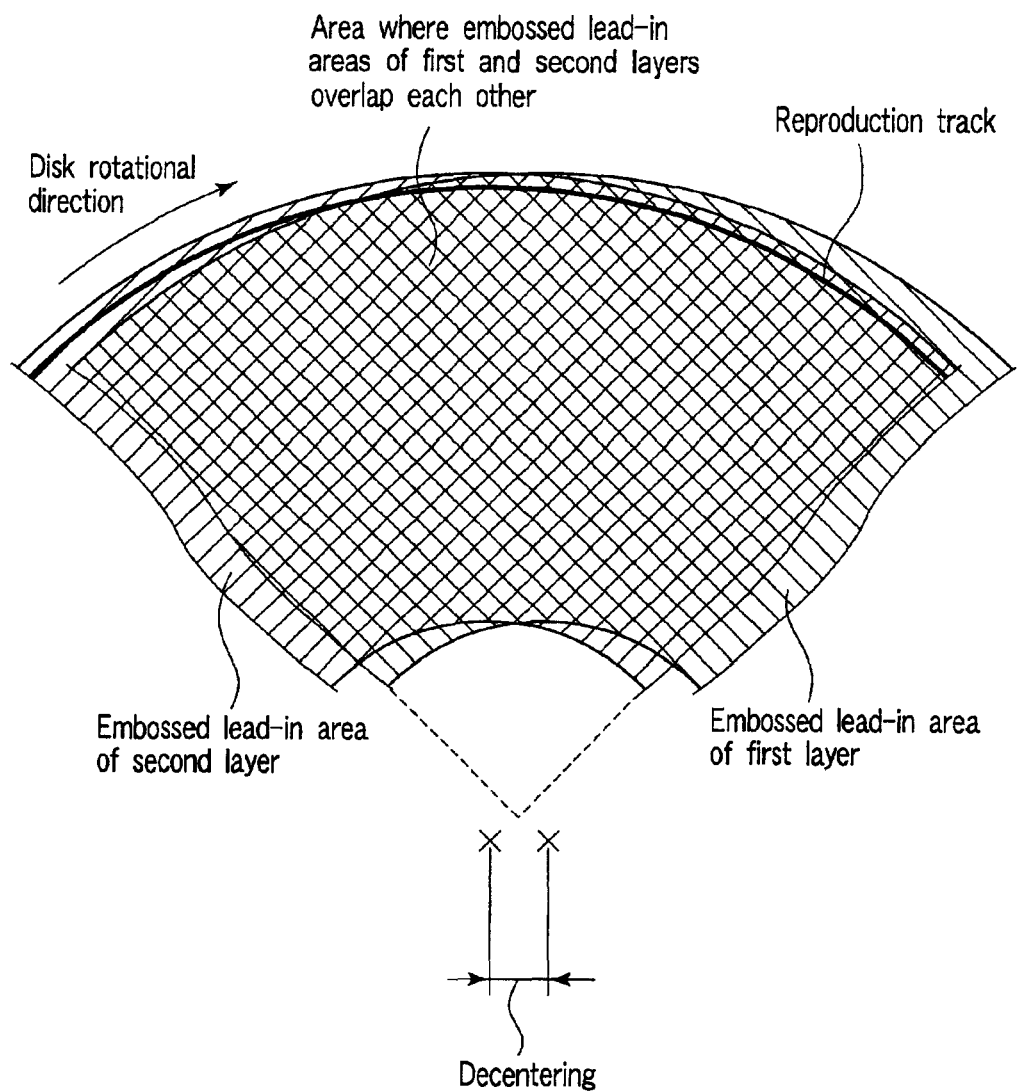
FIG. 7 is a view for explaining a problem which may be posed on the outer periphery side of the embossed lead-in area.

Assume that a disk has a data structure shown in FIG. 7. That is, each layer has an embossed lead-in area on the inner periphery side, and a rewritable data area on the outer periphery side of the lead-in area. Furthermore, the first layer (front side viewed from the objective lens side) and second layer (back side viewed from the objective lens side) suffer decentering (decentering errors).

Figure 8:
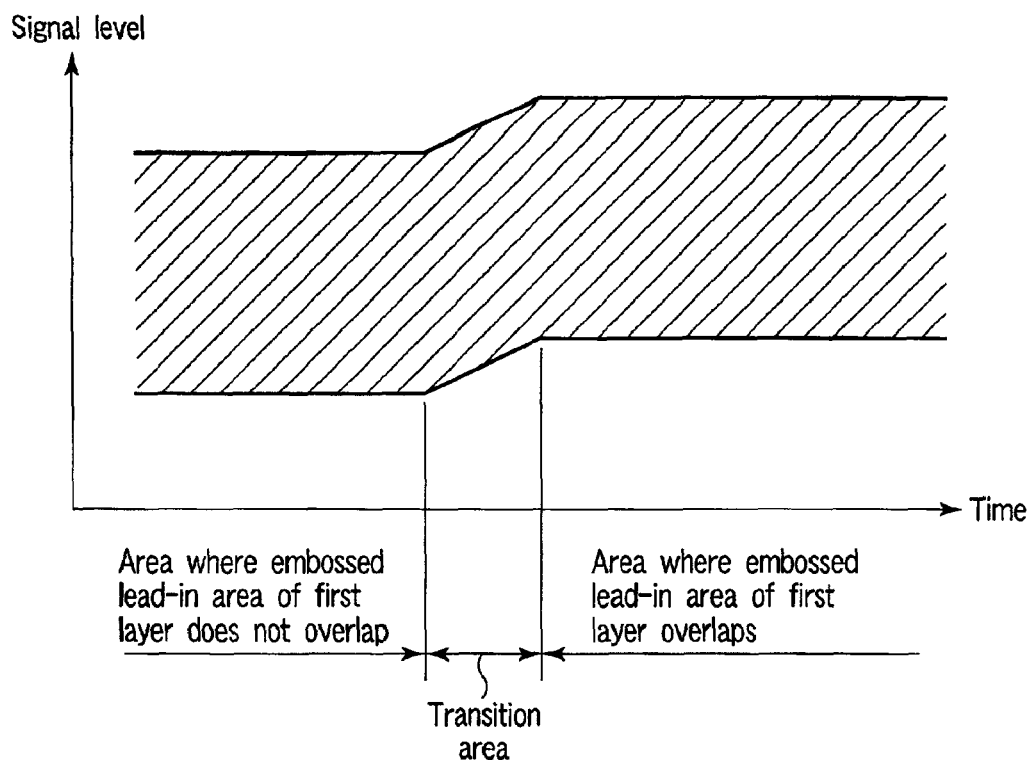
FIG. 8 is a view for explaining a problem which may be posed on the outer periphery side of the embossed lead-in area as in FIG. 7, and is a view for explaining HF signal errors which occur when embossed lead-in areas overlap each other and when they do not overlap each other.

FIG. 8 shows a reproduction signal level obtained upon reproducing a predetermined track on the second layer of the disk shown in FIG. 7. Assume that this predetermined track is, for example, the innermost one of the data area on the second layer. Upon being overlaid on the first layer, a portion where this predetermined track is present passes a portion that does not overlap the embossed lead-in area of the first layer, i.e., a portion that overlaps the data area. Another portion passes a portion that overlaps the embossed lead-in area of the first layer. Such phenomenon occurs since the first and second layers have decentering errors. As shown in FIG. 8, the level of the reproduction signal changes from a portion where the embossed lead-in areas of both the first and second layers do not overlap each other to a portion where they overlap each other via a transition period.

Figure 9:
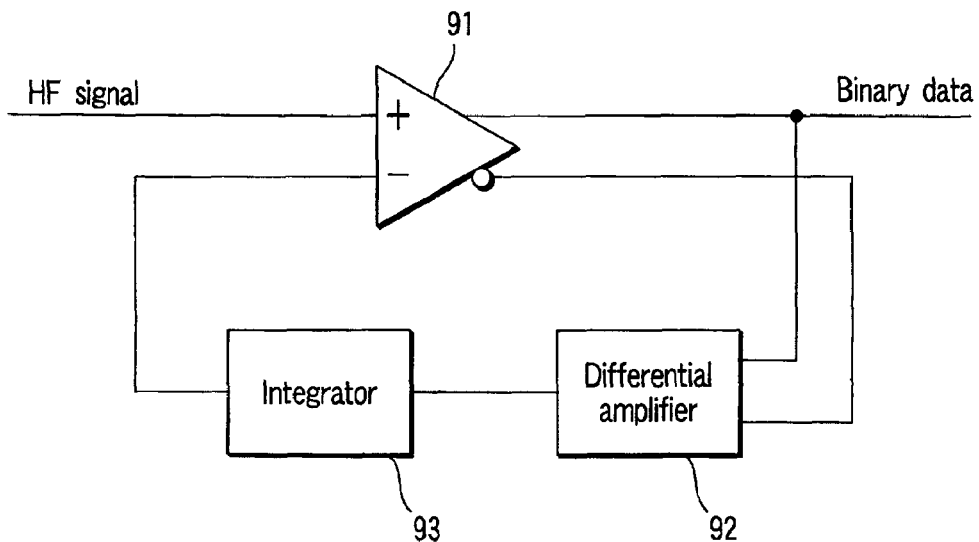
FIG. 9 is a schematic block diagram showing the arrangement of a binarization circuit used to binarize an HF signal.
Figure 10:
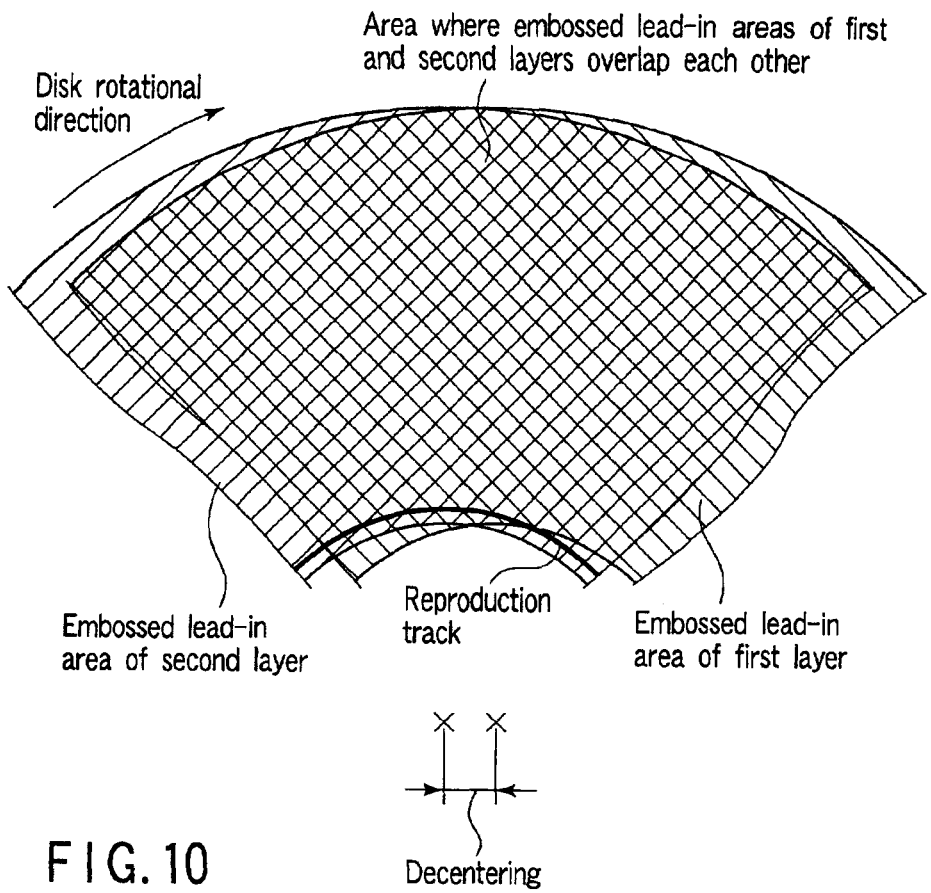
FIG. 10 is a view for explaining a problem which may be posed on the inner periphery side of the embossed lead-in area.
Figure 11:
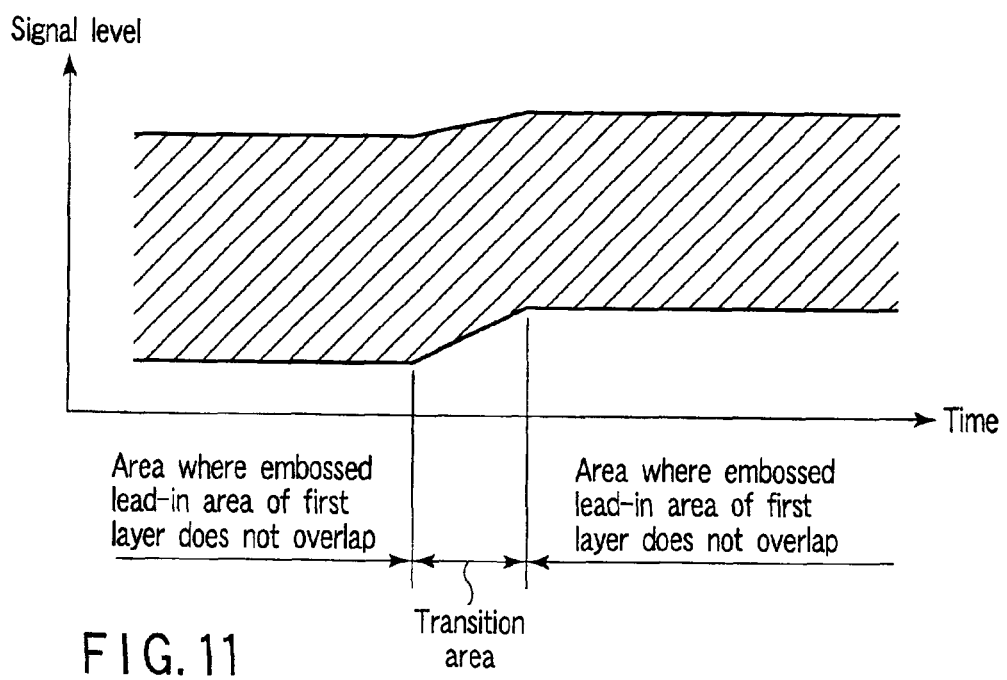
FIG. 11 is a view for explaining a problem which may be posed on the inner periphery side of the embossed lead-in area as in FIG. 10, and is a view for explaining HF signal errors which occur when embossed lead-in areas overlap each other and when they do not overlap each other.

FIG. 9 shows an example of a binarization circuit for binarizing a header field (HF) signal. This binarization circuit is included in the signal processing circuit 119 shown in FIG. 12. This binarization circuit adopts a duty feedback arrangement for controlling a slice level to trace a level variation in a disk. An HF signal is input to the positive input of a comparator 81, and is binarized by being compared with a voltage input to the inverting input by the comparator 81. The output and inverted output of the comparator 81 are input to a differential amplifier 82. The output from the differential amplifier 82 is input to an integrator 83, the output of which is input to the inverting input of the comparator 81. The time constant of the integrator 83 is designed to trace a level variation in the disk without reacting to scratches, dust, and the like. The binarization circuit is arranged to trace a change in signal shown in FIG. 8. However, this circuit cannot trace an abrupt change. Hence, binarization errors occur during a change in signal level, and immediately after the signal level has changed. When such binarization errors occur, information cannot be normally reproduced. Such change in signal occurs upon reproduction of the first layer as that of the second layer.

To solve the aforementioned problems, an information recording medium according to an embodiment of the present invention has the following format.

FIG. 1 shows an example of the format of the information recording medium. This information recording medium has a central hole 15. Furthermore, this information recording medium has a plurality of disk-like information recording layers which are adhered to each other within an allowable decentering error range. Each information recording layer has a recording/reproduction area (data area) 11 and embossed lead-in area 12 at identical radial positions from the center.

The data area 11 neighbors the embossed lead-in area, and is located on the outer periphery side of this area. On the data area 11, physical addresses are recorded by embossed pits, and user data can be recorded by phase change recording marks.

The embossed lead-in area 12 is located at a predetermined radial position. On the embossed lead-in area 12, spiral tracks are formed by embossed pits. Of these spiral tracks, those which are formed within the range of the first radial distance from the radial position of the innermost periphery of the embossed lead-in area toward the outer periphery side correspond to first guard tracks. Also, spiral tracks which are formed within the range of the second radial distance from the radial position of the outermost periphery of the embossed lead-in area toward the inner periphery side correspond to second guard tracks. Tracks (data recording tracks) other than the first and second guard tracks on the embossed lead-in area are recorded with physical addresses and lead-in data by embossed pits. That is, physical addresses and lead-in data are recorded on tracks (data recording tracks) formed between the first and second guard tracks by embossed pits. On the other hand, physical address data and dummy data (insignificant data) are recorded on the first and second guard tracks by embossed prepits. Dummy data may be a run of "0"s or random data.

The physical address data recorded on the entire surface of the information recording medium will be explained below with reference to FIG. 13. Each information recording layer has an embossed lead-in area and data area, as described above. Furthermore, each information recording layer has an embossed lead-out area which neighbors the data area. This embossed lead-out area records the same data as those recorded on the embossed lead-in area.

Each information recording layer has spiral tracks including guard tracks from the inner periphery side toward the outer periphery side. That is, the spiral tracks are formed across the embossed lead-in area, data area, and embossed lead-out area. These spiral tracks are recorded with physical address data by embossed pits at given intervals. For example, there are two methods of assigning physical address data. In one method, physical address data are assigned from the inner periphery side toward the outer periphery side. That is, physical address data are assigned parallel to each other on the respective information recording layers. In the other method, physical address data are assigned from the inner periphery side toward the outer periphery side on one information recording layer, and they are assigned from the outer periphery side toward the inner periphery side on the other information recording layer. That is, physical address data are assigned in opposite directions on the respective information recording layers.

Figure 2:
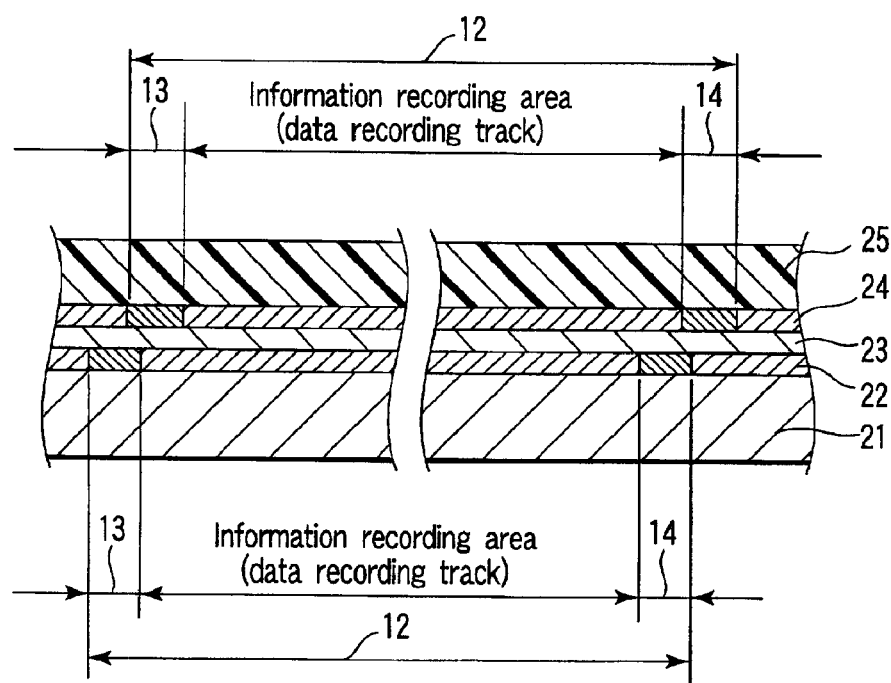
FIG. 2 is a sectional view showing an example of the information recording medium.
Figure 3:
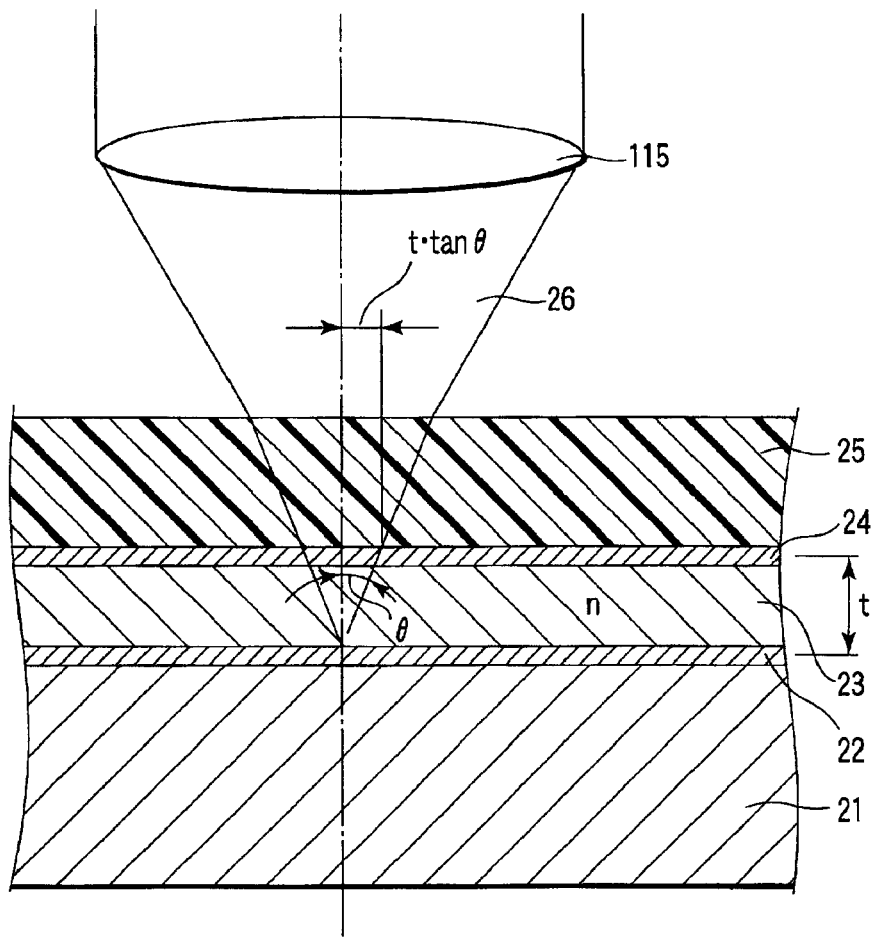
FIG. 3 is a view for explaining the radial distance of a light beam in the other information recording layer when the light beam is just in focus on one information recording layer of the information recording medium.

FIG. 2 is a sectional view of the information recording medium shown in FIG. 1. A second information recording layer 22 is formed on a substrate 21, a first information recording layer 24 is formed on the layer 22 via an intermediate layer 23, and a protection layer 25 is formed on the first information recording layer 24. A light beam (not shown) comes from the protection layer side. FIG. 2 shows a case wherein the first information recording layer 24 (to be simply referred to as a first layer hereinafter) and the second information recording layer 22 (to be simply referred to as a second layer hereinafter) are decentered. That is, the first and second layers are adhered within an allowable decentering range.

First guard tracks 13 are formed within the range of the first radial distance from the radial position of the innermost periphery of the embossed lead-in area 12 toward the outer periphery side. Second guard tracks 14 are formed within the range of the second radial distance from the radial position of the outermost periphery of the embossed lead-in area 12 toward the inner periphery side. Since the embossed lead-in area 12 has such structure, a portion of the embossed lead-in area where lead-in data is recorded (information recording area=data recording tracks) always overlaps the embossed prepit train on the other layer. In this way, the level of the header field signal does not vary greatly on the information recording area. Consequently, no slice error of the binarization circuit occurs.

Let x be the allowable decentering amount (allowable decentering error) of an optical information recording medium. Then, a deviation between the layers becomes equal to or smaller than x. For this reason, the radial distance (area) where guard tracks are formed preferably has a distance (width) of at least x.

Let x be the allowable decentering amount of an optical information recording medium, and t be the physical distance between layers. Also, the objective lens used in recording/reproduction of information has NA (numerical aperture)=n·sin θ (n: the refractive index of an intermediate layer between the layers). At this time, the radius of a light beam 37 on the first layer while the light beam 37 is in focus on the second layer is given by t·tan θ. For this reason, the radial distance (area) where the guard tracks are formed preferably has a distance (width) of at least (x+t·tan θ).

Note that the radius of the light beam 37 on the second layer while the light beam 37 is in focus on the first layer is also given by t·tan θ.

The data structure for one sector in the lead-in area will be explained below with reference to FIG. 4. On the lead-in area, tracks are formed by embossed pits. Physical addresses, lead-in data, and dummy data are recorded by these embossed pits. Assume that the spacing between neighboring physical addresses is one sector.

Figure 4:
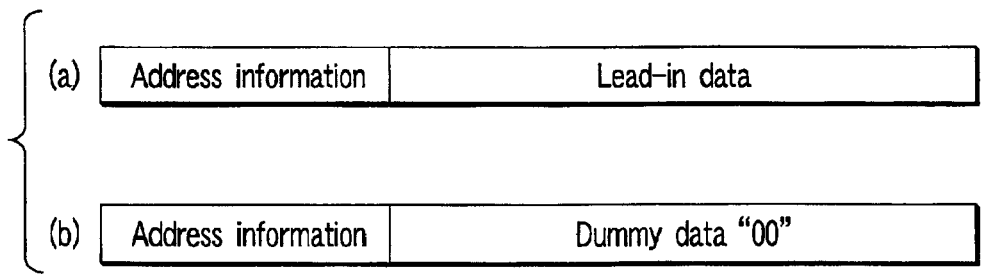
FIG. 4 shows the data structure for one sector on a track in the lead-in area.

FIG. 4((a) of FIG. 4) shows the data structure for one sector on a track (data recording track) other than the guard track of the embossed lead-in area. As shown in (a), one sector is made up of a physical address field and data field. The physical address field records a physical address by embossed pits. The data field records physical format information such as disk structure and recording/reproduction parameters by embossed pits.

FIG. 4((b) of FIG. 4) shows the data structure for one sector on the guard track of the embossed lead-in area. As shown in (b), one sector is made up of a physical address field and data field. The physical address field records a physical address by embossed pits. The data field records dummy data by embossed pits.

As described above, the first guard tracks are formed for the first predetermined distance on the inner periphery side of the embossed lead-in area which inscribes the data area. Furthermore, the second guard tracks are formed for the second predetermined distance on the outer periphery side in the embossed lead-in area. No lead-in data are recorded on these first and second guard tracks. With this format, even in an optical information recording medium having two or more information recording layers, embossed lead-in data can be accurately reproduced.

In this way, the demodulation circuit 120 of the information recording/reproduction apparatus shown in FIG. 12 can accurately reproduce lead-in data from the data recording tracks from which the influence of any allowable decentering errors is cut by the first and second guard tracks.

According to an embodiment of the present invention, the following information recording medium, information reproduction apparatus, and information reproduction method can be provided:

(1) an information recording medium which can absorb decentering errors of a plurality of information recording layers, and can prevent unstable reproduction due to the influence of decentering errors;

(2) an information reproduction method which can accurately reproduce information without being influenced by decentering errors of a plurality of information recording layers; and (3) an information reproduction apparatus which can accurately reproduce information without being influenced by decentering errors of a plurality of information recording layers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising:

a plurality of disk-like information recording layers which are adhered to each other within an allowable decentering error range, each of said information recording layers comprising:

an embossed lead-in area which is located at a predetermined radial position; and a data area which neighbors said embossed lead-in area and is located on an outer periphery side of said embossed lead-in area, and on which user data is recorded by phase change recording marks, said embossed lead-in area comprising:

first guard tracks which are formed within a range of a first radial distance from a radial position of an innermost periphery of said embossed lead-in area toward the outer periphery side;

second guard tracks which are formed within a range of a second radial distance from a radial position of an outermost periphery of said embossed lead-in area toward the inner periphery side; and data recording tracks which are formed between said first and second guard tracks and on which lead-in data is recorded by embossed pits, wherein if x represents the allowable decentering error, t represents a distance between said information recording layers, and n·sin θ (n: a refractive index of an intermediate layer formed between said information recording layers) represents a numerical aperture of an objective lens used in recording/reproduction for said information recording layers, each of the first and second radial distances is (x+t·tan θ), and a defect caused by the allowable decentering error is covered by said first and second guard tracks.

2. A medium according to claim 1, wherein said first and second guard tracks include embossed pits that represent physical address data and dummy data.

* * * * *